United States Patent
Park et al.

[11] 3,730,482
[45] May 1, 1973

[54] TRACTOR JACK

[76] Inventors: Raymond E. Park, McLean, Ill. 61754; Thomas A. Escoubas, P. O. Box 77, Armington, Ill. 61721

[22] Filed: Dec. 9, 1969

[21] Appl. No.: 883,391

[52] U.S. Cl. .................................................. 254/124
[51] Int. Cl. .................................................. B66f 3/00
[58] Field of Search ............................... 254/94, 124

[56] References Cited

UNITED STATES PATENTS

| | | | |
|---|---|---|---|
| 2,348,743 | 5/1944 | McCue | 254/94 X |
| 2,463,305 | 3/1949 | Poor et al. | 254/94 |
| 2,667,329 | 1/1954 | Blaauw et al. | 254/124 |

*Primary Examiner*—Othell M. Simpson
*Attorney*—Imrie and Smiley

[57] ABSTRACT

A device for jacking the rear wheel assemblies of a tractor in the form of an attachment to be operated by the conventional three-point hitch assembly mounted on the tractor. The jack attachment is in the form of a stand, comprising interconnected uprights which are of sufficient length to raise the tractor from the ground surface with the upper end of the uprights supporting the rear axle assembly of the tractor. A shaft is carried by the hitch arms of the three-point hitch assembly and lift arms are pivotally attached at their forward ends to the stand and receive opposite ends of the shaft at their rearward ends. The lift arms are adjustable in length and may be swung into and out of engagement with the shaft so that the proper length of the lift arms may be achieved to accomodate for the jacking action.

6 Claims, 5 Drawing Figures

PATENTED MAY 1 1973
3,730,482
FIG. 1.
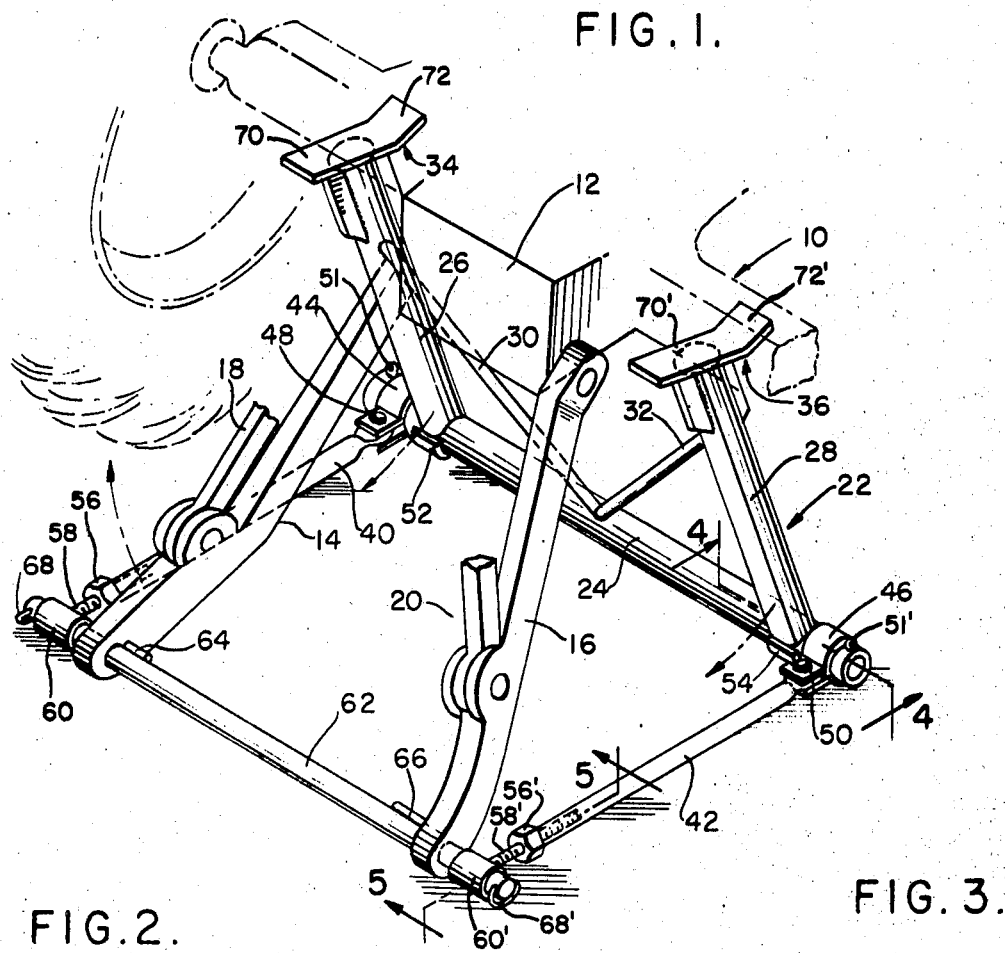
FIG. 2.
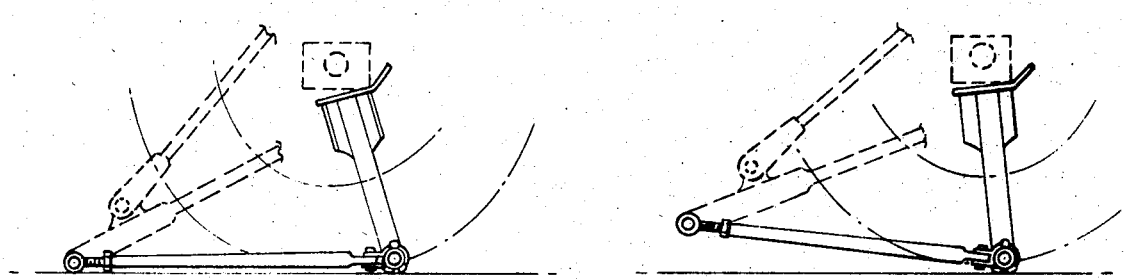
FIG. 3.
FIG. 4.
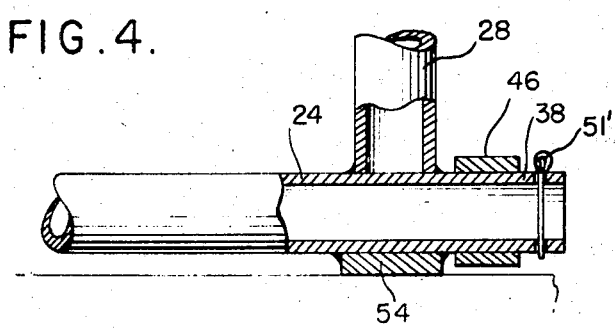
FIG. 5.
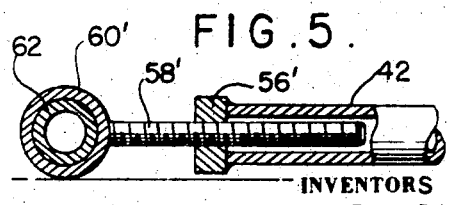
INVENTORS
RAYMOND E. PARK &
THOMAS A. ESCOUBAS
BY Mirie, Smiley, Snyder & Butrum
ATTORNEYS

TRACTOR JACK

BACKGROUND OF THE INVENTION

The present invention relates to an attachment which is capable of being utilized in association with a conventional tractor to elevate the rear portion thereof. Because of the unusual construction of tractors, more conventional jacking devices do not perform well and various jacking attachments have been proposed, some of which are operated through the medium of the three-point hitch mechanism to effect raising and lowering the rear of the tractor. To be completely successful, such an attachment should be of light weight and easy to use, as well as fast and efficient in operation, and, at the same time, its construction and arrangement should not be such as to provide an inordinately high initial cost.

BRIEF DESCRIPTION OF THE DRAWINGS

FIG. 1 is a perspective view showing the jack assembly according to the present invention and illustrating its association with a tractor vehicle;

FIG. 2 is a side elevational view of the assembly as shown in FIG. 1 illustrating the disposition of component parts immediately after being assembled;

FIG. 3 is a view similar to FIG. 2 but showing the assembly in the process of lifting the tractor;

FIG. 4 is an enlarged sectional view taken substantially along the plane of section line 4—4 of FIG. 1; and FIG. 5 is an enlarged sectional view taken substantially along the plane of section line 5—5 of FIG. 1.

DETAILED DESCRIPTION OF THE INVENTION

With reference now more particularly to FIG. 1, reference character 10 indicates in general the rear axle assembly of a tractor vehicle which includes the usual final drive, the housing of which includes the power take-off transfer case portion 12 of usual construction and to the opposite sides of which are pivoted the forward end of the hitch arms 14 and 16 as is conventional. The links 18 and 20 of the three-point hitch assembly are, as is conventional, pivotally attached to the hitch arms 14 and 16 to pivot same about their point of attachment to the transfer case portion 12 thereby to raise and lower the trailing ends of the hitch arms 14 and 16.

The attachment according to the present invention includes a stand assembly 22 and which includes a horizontally and transversely disposed elongate tube 24 adapted to engage the ground and to form the supporting base for the jack assembly when in operative disposition. A pair of spaced uprights 26 and 28 are rigidly affixed as by welding to the ground engaging member 24 and suitable stays or braces 30 and 32 may be provided to impart requisite rigidity to the device. The upper end of the uprights 26 and 28 are provided with saddles 34 and 36 which engage the underside of the rear axle housing substantilaly as is shown in FIGS. 1–3 and which form cradles or saddles for supporting the tractor as will be hereinafter described.

The opposite ends 38,38' of the ground engaging member 24 are extended beyond the uprights 26 and 28, forward ends of the lift arm members 40 and 42 are universally attached to these free opposite end portions of the ground engaging member 24 through the medium of the strap members 44 and 46 and their associated fasteners 48 and 50. Each strap member is disposed in loosely embracing relationship with its respective free end portion 38,38' of the ground engaging member 24 and the fasteners 48 and 50 project through the opposite ends of each strap, as is shown, and the forward end of each lift arm 40 and 42 is disposed between the free ends of the straps and is pivotally attached thereto by the respective fasteners 48 and 50. The assembly is such as to provide a universal joint coupling between the forward ends of the lift arms 40 and 42 and the opposite ends of the ground engaging member 24, that is, establishing pivotal connection between these members about horizontal and vertical axes. Cotter pins or other suitable retaining devices 51,51', are provided outboard of the strap members 44 and 46 to retain them in place. Rocker pads 52 and 54 are fixed to the underside of the ground engaging member 24 below each upright 26 and 28, see particularly FIG. 4, whereby to normally maintain the strap members 44 and 46 somewhat elevated and clear of the supporting surface.

The trailing or rearward ends of the lift arms 40 and 42 are provided with a screw thread member 56,56' FIG. 5, each of which receives the threaded shank 58,58' of an associated sleeve 60. The attachment is completed by the shaft 62 which is adapted to be received through the rearward free end of the hitch arms 14 and 16 in conventional fashion and which shaft may be provided with stop members 64 and 66, limiting the convergent disposition of the hitch arms 14 and 16 and so positioned as to expose opposite free end portions of the shaft 60' laterally thereof. The sleeves 60 and 62 are removably received on these opposite end portions of the shaft 62 and quick-disconnect coupling pin elements 68,68' are provided to retain the sleeves in place.

In using the device, the stand assembly 22 is placed in position with the saddles 34 and 36 engaging the underside of the rear axle housing assembly 10 and the lift arms 40 and 42 are pulled rearwardly to snug the stand assembly in place. With the hitch arms 14 and 16 disposed in a lowered position, the shaft 60 is positioned and the sleeves 60 and 62 are adjusted axially to extend or reduce the effective length of the lift arms 40 and 42 so that the sleeves engage the opposite ends of the shaft 62 without excessive play. The fasteners or coupling elements 64,66 are positioned in place and the three-point hitch assembly raised which will cause the stand assembly 22 to rock forwardly as shown between the positions of FIGS. 2 and 3 thereby to raise the rear wheels of the tractor above the supporting surface. The three-point hitch assembly is then held at the desired position and is simply lowered when it is desired to return the tractor to ground level.

Each of the saddles 34 and 36 includes a horizontally disposed bed plate portion 70,70' and an upwardly inclined forward end portion 72,72' which cooperatively define a crotch which will accomodate for varied types of rear axle housing shapes while at the same time allowing the bed plates to properly support the rear axle housing when the tractor is elevated.

As this invention may be embodied in several forms without departing from the spirit or essential characteristics thereof, the present embodiment is therefore illustrative and not restrictive.

We claim:

1. A tractor jack assembly for a tractor having a three point hitch assembly including a pair of spaced links, said jack comprising, in combination, a stand including a horizontally disposed elongate ground-engaging member and a pair of uprights rigidly connected thereto,
   a saddle at the upper end of each upright adapted to engage beneath a tractor rear axle,
   a shaft adapted to be carried be the links of the three point hitch assembly of the tractor,
   a lift arm at each end of said ground-engaging member, means pivotally attaching one end of each lift arm to an associated end of said ground-engaging member for movement about vertical and horizontal axes, a sleeve carried by the opposite end of each lift arm, and means enabling axial adjustment of the effective length of said arm between said pivotal attachment means and said sleeve, and
   means for releasably retaining said sleeves on the respective ends of said shaft.

2. The tractor jack assembly as defined in claim 1, wherein each saddle includes a horizontally disposed bed plate portion overlying the upper end of its associated upright, and an upwardly inclined forward end portion extending from said bed plate portion.

3. The tractor jack assembly as defined in claim 1, wherein said axial adjustment means comprises a threaded steam on each sleeve, and a screw thread member on the end of said arm and receiving said stem.

4. The tractor jack assembly as defined in claim 3, wherein said means pivotally attaching the one end of each lift arm comprises a pair of straps embracing opposite ends of said ground-engaging member, and a fastener joining the opposite ends of each strap, each lift arm having its one end pivotally receiving an associated fastener.

5. The tractor jack assembly as defined in claim 4, wherein said ground-engaging member is cylindrical, and an arcuate rocker pad is fixed to said ground-engaging member beneath each upright.

6. A tractor jack for use in combination with a tractor having a rear axle and a three-point hitch mounted at the rear of the tractor and including a pair of trailing hitch arms and means for pivoting said hitch arms to raise and lower the free ends thereof, said tractor jack comprising:
   a stand including a horizontally disposed elongate ground-engaging member extending transversely of the tractor to be disposed ahead of the tractor rear axle, and a pair of rigid uprights extending from said ground-engaging member and each having a saddle at its upper end for engaging the under side of the tractor rear axle;
   a lift arm at each end of said ground-engaging member, means pivotally attaching one end of each lift arm to an associated end of said ground-engaging member for movment about vertical and horizontal axes, a sleeve carried by the opposite end of each lift arm for axial adjustment relative thereto,
   a shaft projecting through and carried by said free ends of said hitch arms and presenting opposite ends projecting laterally from said hitch arms; and
   means for retaining said sleeves on the respective ends of said shaft whereby upward pivotal motion of said hitch arms will rock said stand about said ground-engaging member to raise the tractor.

* * * * *